US011687422B2

(12) United States Patent
Witt et al.

(10) Patent No.: US 11,687,422 B2
(45) Date of Patent: *Jun. 27, 2023

(54) SERVER CLUSTERING IN A COMPUTING-ON-DEMAND SYSTEM

(71) Applicant: Salesforce, Inc., San Francisco, CA (US)

(72) Inventors: Emily Katherine Witt, Livermore, CA (US); Richard Cooke, Silver Spring, MD (US); William Thomas Everhart, Jr., Silver Spring, MD (US); Jinendrakumar J. Patel, Silver Spring, MD (US); Vijay Kumar, Edison, NJ (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/178,216

(22) Filed: Feb. 17, 2021

(65) Prior Publication Data

US 2021/0232467 A1 Jul. 29, 2021

Related U.S. Application Data

(63) Continuation of application No. 15/857,496, filed on Dec. 28, 2017, now Pat. No. 10,956,288, which is a (Continued)

(51) Int. Cl.
*G06F 11/20* (2006.01)
*G06F 16/00* (2019.01)
(Continued)

(52) U.S. Cl.
CPC ........ *G06F 11/203* (2013.01); *G06F 9/45558* (2013.01); *G06F 9/5077* (2013.01);
(Continued)

(58) Field of Classification Search
CPC . H04L 41/0806; H04L 41/0654; H04L 45/28; H04L 47/70; H04L 67/00;
(Continued)

(56) References Cited

U.S. PATENT DOCUMENTS 5,577,188 A 11/1996 Zhu
5,608,872 A 3/1997 Schwartz et al.
(Continued)

OTHER PUBLICATIONS

Advisory Action, U.S. Appl. No. 12/940,682, dated May 24, 2013, 3 pages.
(Continued)

*Primary Examiner* — Phong La
(74) *Attorney, Agent, or Firm* — Nicholson, De Vos, Webster & Elliott, LLP

(57) ABSTRACT

A device may provision two or more servers, each of the servers including a network interface. In addition, the device may enable the network interface in each of the provisioned servers, create a shared volume, assign the shared volume to each of the provisioned servers, and enable a clustering application on each of the provisioned servers to form a cluster comprising the provisioned servers, the cluster having a heartbeat via the network interfaces.

18 Claims, 12 Drawing Sheets

Related U.S. Application Data continuation of application No. 14/637,258, filed on Mar. 3, 2015, now Pat. No. 9,886,360, which is a continuation of application No. 14/327,828, filed on Jul. 10, 2014, now Pat. No. 8,972,581, which is a continuation of application No. 12/940,682, filed on Nov. 5, 2010, now Pat. No. 8,782,238.

(51) Int. Cl.

| | | |
|---|---|---|
| *H04L 29/08* | (2006.01) | |
| *G06F 9/455* | (2018.01) | |
| *G06F 9/50* | (2006.01) | |
| *H04L 67/00* | (2022.01) | |
| *H04L 67/1004* | (2022.01) | |
| *H04L 67/1001* | (2022.01) | |
| *H04L 45/28* | (2022.01) | |
| *H04L 47/70* | (2022.01) | |
| *H04L 41/0806* | (2022.01) | |
| *H04L 67/10* | (2022.01) | |
| *H04L 41/0654* | (2022.01) | |

(52) U.S. Cl.
CPC .......... *G06F 16/00* (2019.01); *H04L 41/0806* (2013.01); *H04L 45/28* (2013.01); *H04L 47/70* (2013.01); *H04L 67/00* (2013.01); *H04L 67/10* (2013.01); *H04L 67/1001* (2022.05); *H04L 67/1004* (2013.01); *G06F 2009/45579* (2013.01); *G06F 2009/45595* (2013.01); *H04L 41/0654* (2013.01)

(58) Field of Classification Search
CPC . H04L 67/01; H04L 67/1004; H04L 67/1001; G06F 2009/45579; G06F 2009/45595; G06F 11/203; G06F 16/00; G06F 9/45558; G06F 9/5077
See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,101,508 A | 8/2000 | Wolff |
| 6,134,673 A | 10/2000 | Chrabaszcz |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,185,601 B1 | 2/2001 | Wolff |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,397,345 B1 | 5/2002 | Edmonds et al. |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,718,383 B1 | 4/2004 | Hebert |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,779,039 B1 | 8/2004 | Bommareddy et al. |
| 6,782,383 B2 | 8/2004 | Subramaniam et al. |
| 6,782,416 B2 | 8/2004 | Cochran et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,213,065 B2 | 5/2007 | Watt |
| 7,260,625 B2 | 8/2007 | Sugiura et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,469,279 B1 | 12/2008 | Stamler et al. |
| 7,508,789 B2 | 3/2009 | Chan |
| 7,603,483 B2 | 10/2009 | Psounis et al. |
| 7,620,655 B2 | 11/2009 | Larsson et al. |
| 7,657,796 B1 | 2/2010 | Kaiser et al. |
| 7,698,160 B2 | 4/2010 | Beaven et al. |
| 7,779,475 B2 | 8/2010 | Jakobson et al. |
| 7,814,364 B2 | 10/2010 | Sankaran et al. |
| 7,851,004 B2 | 12/2010 | Hirao et al. |
| 7,930,476 B1 | 4/2011 | Castelli et al. |
| 7,987,392 B2 | 7/2011 | Boctor et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,036,105 B2 | 10/2011 | Arrowood et al. |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,166,257 B1 | 4/2012 | Holl et al. |
| 8,209,308 B2 | 6/2012 | Rueben et al. |
| 8,209,333 B2 | 6/2012 | Hubbard et al. |
| 8,260,840 B1 | 9/2012 | Sirota et al. |
| 8,260,893 B1 * | 9/2012 | Bandhole .............. G06F 9/5083 709/224 |
| 8,275,836 B2 | 9/2012 | Beaven et al. |
| 8,369,212 B2 | 2/2013 | Howard et al. |
| 8,457,545 B2 | 6/2013 | Chan |
| 8,464,250 B1 | 6/2013 | Ansel |
| 8,484,111 B2 | 7/2013 | Frankland et al. |

(56) References Cited

U.S. PATENT DOCUMENTS

| | | |
|---|---|---|
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 8,775,438 B1 | 7/2014 | Brooker et al. |
| 2001/0044791 A1 | 11/2001 | Richter et al. |
| 2002/0049608 A1 | 4/2002 | Hartsell et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0126202 A1 | 7/2003 | Watt |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0240932 A1 | 10/2005 | Billau et al. |
| 2006/0021019 A1 | 1/2006 | Hinton et al. |
| 2008/0056123 A1 | 3/2008 | Howard et al. |
| 2008/0126834 A1 | 5/2008 | Sankaran et al. |
| 2008/0162983 A1 | 7/2008 | Baba et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0271412 A1 | 10/2009 | Lacapra et al. |
| 2009/0276771 A1 | 11/2009 | Nickolov et al. |
| 2010/0057913 A1 | 3/2010 | Dehaan |
| 2010/0070732 A1* | 3/2010 | Strutt .................. G06F 3/0605 711/170 |
| 2010/0169477 A1* | 7/2010 | Stienhans ............ G06F 9/5083 709/224 |
| 2010/0172236 A1 | 7/2010 | Madrahalli et al. |
| 2010/0293544 A1 | 11/2010 | Wilson et al. |
| 2011/0154320 A1* | 6/2011 | Verma ................ G06F 9/45558 718/1 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0110275 A1* | 5/2012 | Ganti ..................... G06F 12/08 711/E12.001 |
| 2012/0124211 A1* | 5/2012 | Kampas ................ G06F 9/50 709/226 |
| 2012/0233137 A1 | 9/2012 | Jakobson et al. |
| 2012/0290407 A1 | 11/2012 | Hubbard et al. |
| 2013/0066945 A1 | 3/2013 | Das et al. |
| 2013/0212497 A1 | 8/2013 | Zelenko et al. |
| 2013/0247216 A1 | 9/2013 | Cinarkaya et al. |
| 2017/0013025 A1* | 1/2017 | Shakhov ............ H04L 65/1046 |

OTHER PUBLICATIONS

Advisory Action, U.S. Appl. No. 14/637,258, dated Feb. 24, 2017, 5 pages.
Advisory Action, U.S. Appl. No. 15/857,496, dated Sep. 4, 2020, 6 pages.
Advisory Action, U.S. Appl. No. 15/857,496, dated Sep. 13, 2019, 3 pages.
Examiner initiated interview summary, U.S. Appl. No. 15/857,496, dated Sep. 13, 2019, 2 pages.
Final Office Action, U.S. Appl. No. 12/940,682, dated Dec. 11, 2013, 35 pages.
Final Office Action, U.S. Appl. No. 12/940,682, dated Mar. 26, 2013, 37 pages.
Final Office Action, U.S. Appl. No. 14/637,258, dated Dec. 1, 2016, 38 pages.
Final Office Action, U.S. Appl. No. 15/857,496, dated Jun. 29, 2020, 40 pages.
Non-Final Office Action, U.S. Appl. No. 12/940,682, dated Jul. 17, 2013, 37 pages.
Non-Final Office Action, U.S. Appl. No. 12/940,682, dated Oct. 19, 2012, 25 pages.
Non-Final Office Action, U.S. Appl. No. 14/637,258, dated Jun. 13, 2016, 53 pages.
Non-Final Office Action, U.S. Appl. No. 15/857,496, dated Jan. 27, 2020, 36 pages.
Notice of Allowance, U.S. Appl. No. 15/857,496, dated Nov. 18, 2020, 10 pages.
Notice of Allowance, U.S. Appl. No. 12/940,682, dated Mar. 10, 2014, 13 pages.
Notice of Allowance, U.S. Appl. No. 14/327,828, dated Dec. 19, 2014, 4 pages.
Notice of Allowance, U.S. Appl. No. 14/327,828, dated Oct. 29, 2014, 18 pages.
Notice of Allowance, U.S. Appl. No. 14/637,258, dated Sep. 15, 2017, 11 pages.

* cited by examiner

SERVER CLUSTERING IN A COMPUTING-ON-DEMAND SYSTEM

RELATED APPLICATIONS

This application is a continuation of application Ser. No. 15/857,496 filed Dec. 28, 2017 (now U.S. Pat. No. 10,956,288 issued Mar. 23, 2021), which is a continuation of application Ser. No. 14/637,258 filed Mar. 3, 2015 (now U.S. Pat. No. 9,886,360 issued Feb. 6, 2018), which is a continuation of application Ser. No. 14/327,828, filed Jul. 10, 2014 (now U.S. Pat. No. 8,972,581 issued Mar. 3, 2015), which is a continuation of application Ser. No. 12/940,682 filed Nov. 5, 2010 (now U.S. Pat. No. 8,782,238 issued Jul. 15, 2014), which are hereby incorporated herein by reference.

BACKGROUND INFORMATION

An in-house system developer may sometimes purchase and stage devices to build a system. When purchasing the devices, the system developer may evaluate device specifications, price, and/or equipment compatibility in light of particular project requirements. When staging the devices, the system developer may install operating systems, applications, databases and web servers, may apply patches, and/or may configure the devices.

DETAILED DESCRIPTION OF PREFERRED EMBODIMENTS

The following detailed description refers to the accompanying drawings. The same reference numbers in different drawings may identify the same or similar elements.

As described below, a system may provision both virtual resources and physical resources. When a user wishes to obtain computing resources (e.g., a network, a server, an application, a web server, etc.), the user may connect to an integrated provisioning system via a web portal. Once connected via a web interface, the user may input parameters that describe the desired resources. Based on the parameters, the integrated resource provisioning system may provision and allocate virtual and/or physical resources with or without manual intervention from a system administrator or an operator.

In some implementations, the integrated resource provisioning system may provision and allocate clusters. Each cluster may include at least one standby device and remaining active devices that are interconnected via a heartbeat network. When one of the active devices in the cluster fails, the standby device may become active, replacing the failed device to ensure high availability of the cluster. Furthermore, to prevent the failed device from corrupting a storage device that is shared among the active devices, the integrated resource provisioning system may fence the failed device.

Figure 1:
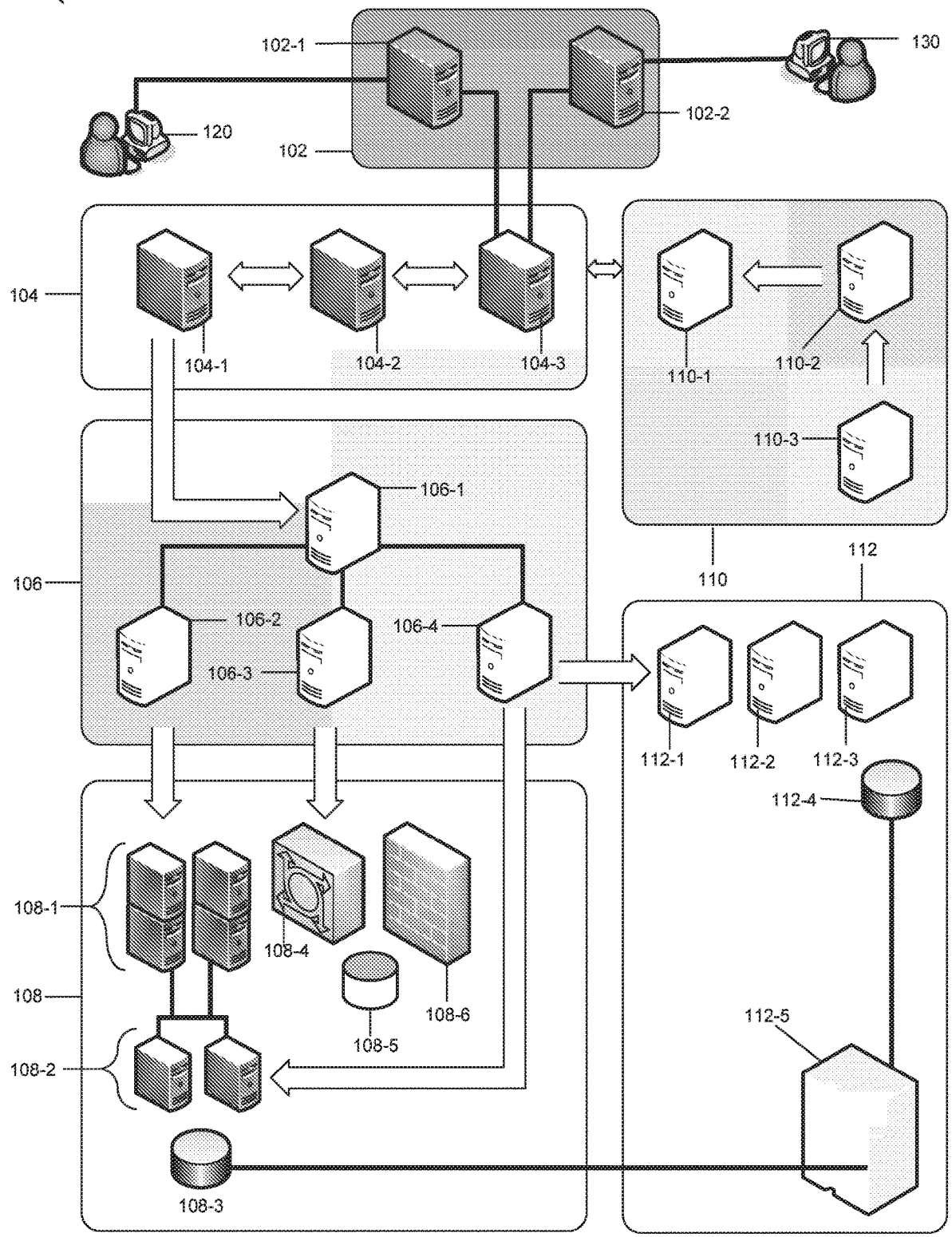
FIG. 1 is a diagram illustrating an exemplary network in which concepts

FIG. 1 is a diagram illustrating an exemplary network in which concepts described herein may be implemented. In one implementation, network 100 may include one or more wired and/or wireless networks that are capable of exchanging information, such as voice, video, data, multimedia information, text, etc. For example, network 100 may include one or more public switched telephone networks (PSTNs) or another type of switched network. Network 100 may also include one or more wireless networks and may include a number of transmission towers for receiving wireless signals and relaying the received signals toward the intended destination. Network 100 may further include one or more packet switched networks, such as an Internet Protocol (IP) based network, a local area network (LAN), a wide area network (WAN), a personal area network (PAN), an intranet, the Internet, or another type of network that is capable of exchanging information.

As shown, network 100 may include a presentation network 102, resource management network 104, workflow network 106, virtual system network 108, inventory management network 110, and physical resource network 112. For simplicity, network 100 of FIG. 1 does not show other networks or network components, such as bridges, routers, switches, wireless devices, etc. Depending on the implementation, network 100 may include additional, fewer, or different networks and/or network components.

Presentation network 102 may include devices that interact with users and system administrators. As further shown in FIG. 1, presentation network 102 may include an administrator portal device 102-1 and a user portal device 102-2. Administrator portal device 102-1 may interact with and relay information between a system administrator device, shown as item 120, and resource management network 104. Through the interaction, system administrator device 120 may perform system/network administration tasks (e.g., managing user accounts, performing an action that a user is not authorized to perform, manage a resource such as a cluster, etc.).

User portal device 102-2 may interact with and relay information between a user device, illustrated as item 130, and resource management network 104. User device 130 may access provisioning services that are available via user portal device 102-2. For example, user device 130 may request resource management network 104 to provision or create a cluster, provision a server, or clone a virtual server.

Resource management network 104 may provide provisioning services and information pertaining to resources in networks 102-112. In providing the provisioning services/ the information, resource management network 104 may track pools of resources that are available to user device 130, reserve a portion of the resources based on a request from user device 130, and allocate and configure the reserved resources to a user at user device 130. In addition, resource management network 104 may deallocate the resources (e.g., return the portion to the pool) when user device 130 indicates that the user does not need the resources. In addition, resource management network 104 may provide support for administrative tasks (e.g., administer users perform resource allocation tasks that a user is not authorized to perform, etc.). The services that resource management network 104 provides may be associated with a cluster, such as provisioning a cluster, creating a cluster, de-provisioning a cluster, etc.

As further shown in FIG. 1, resource management network 104 may include a job database device 104-1, resource manager database 104-2, and resource management device 104-3. Job database device 104-1 may receive a job description (e.g., a list of tasks) from resource management device 104-3 and store it in an active job queue until the job is performed. Resource manager database 104-2 may store and/or retrieve configuration/usage data pertaining to a particular user and/or other bookkeeping information.

Resource management device 104-3 may receive requests for services from administrator/user device 120/130 via portal devices 102-1 and 102-2, and render the requested services. In rendering the services, resource management device 104-3 may execute functions that are listed in FIGS. 5A and 5B.

The services that resource management device 104-3 renders may include provisioning/de-provisioning resources based on inventory information provided by inventory management network 110. To provision/de-provision the resources (e.g., cluster), resource management device 104-3 may create a description of a job based on: user input relayed by user portal device 102-2; user configuration; and/or available resources. Resource management device 104-3 may handoff the job description to job database device 104-1, to be placed in the active job queue. In some implementations, resource management device 104-3 may provision multiple servers, allocate Internet Protocol (IP) addresses to the servers, provision a storage space shared by the servers, and create a cluster from the servers.

In providing the services, resource management device 104-3 may manage resource objects that correspond to physical or virtual resources in networks 102-112. Thus, for example, when user device 130 requests information relating to a physical server, via user portal device 102-2, resource management device 104-3 may provide user device 130 with information from the resource object representing the physical server. Resource management device 104-3 may receive data for instantiating the resource objects from one or more databases in networks 102-112 (e.g., a database in network 110).

Workflow network 106 may perform jobs whose descriptions are in the active job queue at job database device 104-1. Once the job is performed, workflow network 106 may instruct job database device 104-1 to de-queue the job description (e.g., provisioning a server, creating a cluster, etc.). As further shown in FIG. 1, workflow network 106 may include a workflow engine device 106-1, virtual machine management (VMM) control device 106-2, network management device 106-3, and resource lifecycle management device 106-4.

Workflow engine device 106-1 may perform subtasks of a job as defined by a job description in the active job queue at job database device 104-1. In one implementation, workflow engine device 106-1 may poll the active job queue to detect the job description. Workflow engine device 106-1 may request job database device 104-1 to remove the job description from the queue when the subtasks are completed.

In driving/performing each of the subtasks of a job, workflow engine device 106-1 may employ VMM control device 106-2, network management device 106-3, and/or resource lifecycle management device 106-4. Each of the subtasks in the job description may entail allocation, deallocation, controlling, and/or monitoring of virtual resources, physical resources, and/or network resources. For example, assume that user device 130 requests resource management device 104-3 to allocate a virtual machine. In response, resource management device 104-3 may create a job description that includes subtasks for creating a virtual machine, and place the job description at job database device 104-1. When workflow engine device 106-1 is about to perform the subtasks associated with creating the virtual machine, workflow engine device 106-1 may dispatch one or more requests for performing virtual machine-related functions to VMM control device 106-2 (e.g., a request to create the virtual machine, clone a virtual machine, etc.).

VMM control device 106-2, upon receiving requests from workflow engine device 106-1, may control and/or monitor one or more virtual machines by interacting with hypervisors. The term "hypervisor," as used herein, may refer to a program that monitors, creates, runs, removes, and/or controls a virtual machine (e.g., controls a lifecycle of a virtual machine) on a physical device. For example, when VMM control device 106-2 receives a request to create a virtual machine from workflow engine device 106-1, VMM control device 106-2 may issue a command to a hypervisor. The hypervisor may create the virtual machine on the host device.

Network management device 106-3 may perform network configuration functions on behalf of workflow engine device 106-1. The functions may include configuring network infrastructure components. FIG. 1 shows a number of different types of network objects that network management device 106-3 may manage, such as, for example, a virtual load balancer 108-4, virtual LAN 108-5, and virtual firewall 108-6. Virtual load balancer 108-4, virtual LAN 108-5, and virtual firewall 108-6 are further described below.

Resource lifecycle management device 106-4 may perform subtasks for provisioning a physical hardware device for the user. For example, resource lifecycle management device 106-4 may install an operating system on a server, install an application, etc. As shown in FIG. 1, resource lifecycle management device 106-4 may act on physical server devices 112-1 through 112-3 as well as virtual machines 108-2, as described below.

Virtual system network 108 may include devices and/or components for hosting and implementing virtual machine-related and network component-related resources that may be provisioned for the user. As shown, these resources may include a hypervisor group 108-1, virtual machines 108-2, logical volume 108-3, virtual load balancer 108-4, virtual LAN 108-5, and virtual firewall 108-6.

Hypervisor group 108-1 may include a logical group of hypervisors and a hypervisor manager (not shown). When hypervisor group 108-1 receives a command or a request from VMM control device 106-2 (e.g., create a virtual machine), the hypervisor manager may issue a command/request to a hypervisor. The hypervisor may then create the virtual machine on a host device on which the hypervisor is installed. Depending on the implementation, the hypervisor may be hosted on a hardware device without an operating system, or alternatively, may be hosted as a software component running on top of an operating system.

Virtual machines 108-2 may include a software emulation of a computer system (e.g., a server, a personal computer, etc.). Each virtual machine 108-2 may be instantiated, removed, and managed by a hypervisor. Once created, user device 130 may utilize virtual machine 108-2 as if it were a physical device.

Logical volume 108-3 may include storage on a network (e.g., network attached storage (NAS), a disk on storage area network (SAN), etc.). Local volume 108-3 may be allocated as a resource by workflow engine 106-1. Once allocated, logical volume 108-1 may be mounted on a mount point on a virtual machine and used as storage (e.g., a file system, swap space, etc.). Virtual load balancer 108-4 may include an emulation of a load balancer, and may be instantiated or removed upon demand from user device 130. The user may configure virtual load balancer 108-4 such that network traffic is distributed over the virtual and/or physical resources in accordance with specified thresholds (e.g., send 40% of network traffic to one of virtual machines 108-2 and 60% of network traffic to the other virtual machine).

Virtual LAN 108-5 may be created upon demand from user device 130. User device 130 may configure and place selected virtual and physical resources on specific virtual LAN 108-5. Virtual firewall 108-6 may include an emulation of a physical firewall, and may be instantiated or deleted upon demand from user device 130. Once provisioned, virtual firewall 108-6 may be attached to virtual LAN 108-5 to protect the virtual and/or physical resources against undesired network traffic.

Inventory management network 110 may track inventory of network resources and provide inventory information to resource management network 104. As further shown in FIG. 1, inventory management network 110 may include IP address management device 110-1, data warehouse device 110-2, and an inventory management device 110-3.

IP address management device 110-1 may provision an IP address from a pool of IP addresses. In one implementation, in provisioning an IP address, IP address management device 110-1 may take into account network address translation schemes to identify which VLAN the IP address belongs to, such that an IP address conflict does not arise within the VLAN. When IP address management device 110-1 de-provisions an IP address, IP address management device 110-1 may return the IP address to the pool of IP addresses.

Data warehouse device 110-2 may include a database of inventory of resources that are available for provisioning, resources that have been provisioned for the user, and configuration management information. When a resource is added to a pool, is provisioned, or is de-provisioned, data warehouse device 110-2 may update/record the information (e.g., inventory information) about the resource in the database. In addition, data warehouse device 110-2 may write and insert data associated with configuration (e.g., a version of an operating system that is installed on a provisioned physical server, an IP address, etc.) into the database when the resource configuration changes.

Inventory management device 110-3 may obtain inventory and configuration related information by monitoring physical devices, and pass the information to data warehouse device 110-2.

Physical resource network 112 may include physical resources. These physical resources may be provisioned/de-provisioned upon a request from resource lifecycle management device 106-4. When physical resources in physical resource network 112 are provisioned/de-provisioned, resource lifecycle management device 106-4 or inventory management device 110-3 may update data warehouse device 110-2 with information about the provisioning and configuration information.

As further shown in FIG. 1, physical resource network 112 may include physical resources 112-1 through 112-3 (individually referred to as physical resource 112 and collectively as physical resources 112), logical volume 112-4, and storage device 112-5. Physical resource 112 may include a physical device or a component that may be provisioned via resource lifecycle management device 106-4. Logical volume 112-4 may include similar component as logical volume 108-3, and may operate similarly. Unlike logical volume 108-3 that is mounted on a virtual machine, however, logical volume 112-3 may be mounted on physical resource 112. Storage device 112-5 may include storage from which logical volumes (e.g., logical volume 108-3 or 112-4) may be allocated. Examples of storage device 112-5 may include a SAN disk and NAS devices.

In FIG. 1, although each of networks 102 through 112 are shown as including a number of devices, in an actual implementation, networks 102 through 112 may include additional, fewer, or different devices and components than those shown in FIG. 1. In addition, depending on the implementation, functionalities of each of devices within networks 102-112 may be aggregated over fewer devices or distributed over additional devices. For example, in one implementation, functionalities of devices 112-1 through 112-3 in resource management network 112 may be provided by a single server device.

Figure 2:
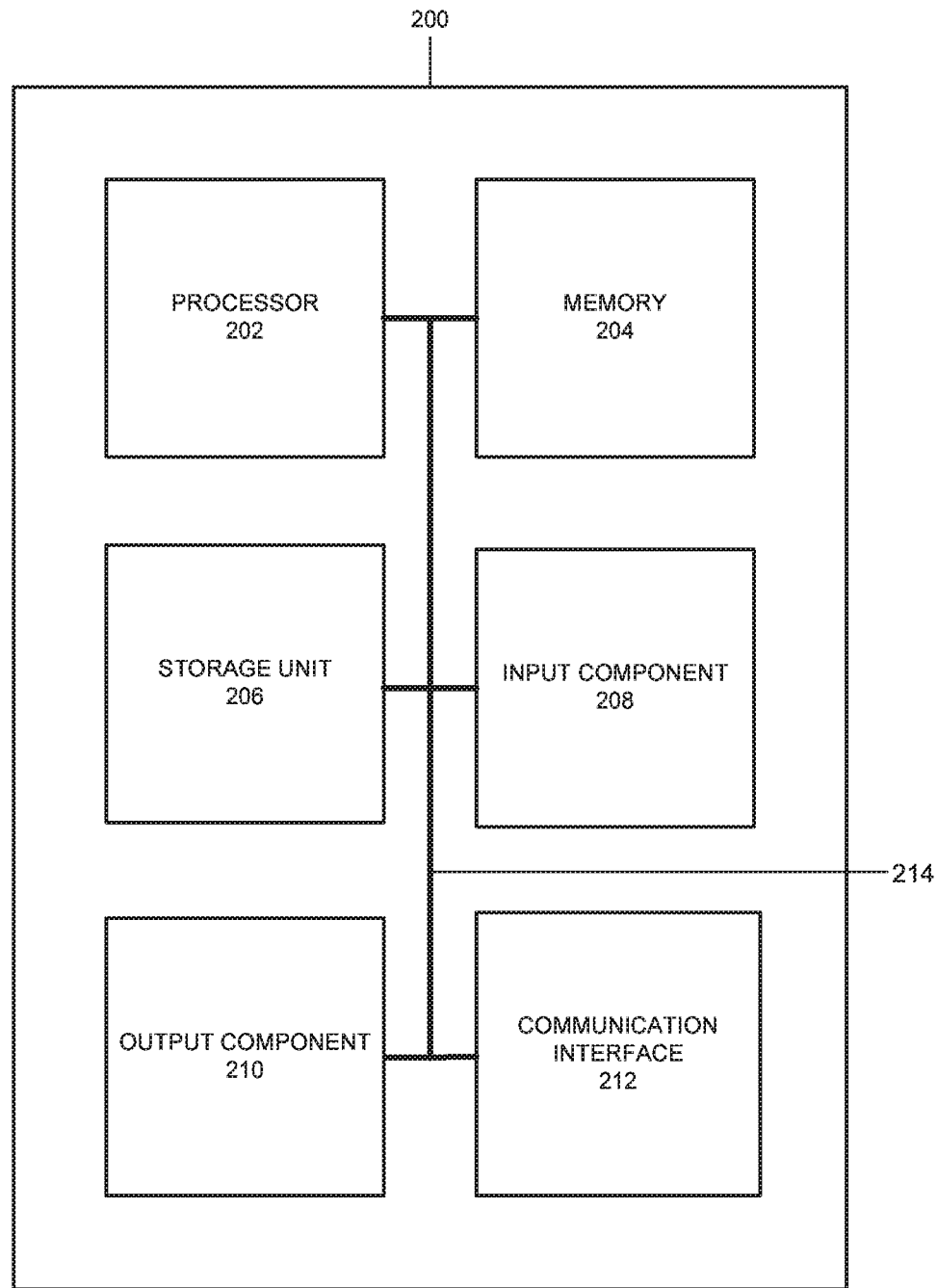
FIG. 2 is a block diagram of an exemplary network device shown in FIG. 1.

FIG. 2 is a block diagram of an exemplary network device 200. Network device 200 may be used to implement each of the devices in networks 102 through 112. In addition, network device 200 may also be used to implement components of a cluster. As shown in FIG. 2, network device 200 may include a processor 202, memory 204, storage unit 206, input component 208, output component 210, communication interface 212, and bus 214.

Processor 202 may include one or more processors, microprocessors, application specific integrated circuits (ASICs), field programmable gate arrays (FPGAs), or other processing logic that may interpret and execute instructions. Memory 204 may include static memory, such as read only memory (ROM), and/or dynamic memory, such as random access memory (RAM) or onboard cache, for storing data and machine-readable instructions. Storage unit 206 may include a magnetic and/or optical storage/recording medium. In some embodiments, storage unit 206 may be mounted under a directory tree or may be mapped to a drive. In some implementations, storage unit 206 may be part of another network device (e.g., storage device 112-5) or a network (e.g., storage area network (SAN)). Depending on the context, the term "medium," "memory," "storage," "storage device," "storage medium," and/or "storage unit" may be used interchangeably. For example, a "computer-readable storage device" or "computer readable storage medium" may refer to both a memory and/or storage device.

Input component 208 may permit a user to input information to network device 200. Input component 208 may include, for example, a keyboard, a keypad, a mouse, a pen, a microphone, a touch screen, voice recognition and/or biometric mechanisms, etc. Output component 210 may include a mechanism that outputs information to the user. Output component 210 may include, for example, a display, a printer, a speaker, etc. In some implementations, because network device 200 may operate as a server device, network device 200 may include a minimal number of input components 208 and output components 210 (e.g., a keyboard and/or a console), to minimize cost and to increase robustness.

Communication interface 212 may enable network device 200 or the components of network device 200 to communicate with other devices and/or systems via a network, and may include one or more network interface cards (e.g., an Ethernet interface) for communicating with other devices. In one implementation, communication interface 212, for example, may be attached to a server blade that hosts processor 202. Bus 214 may provide an interface through which components of network device 200 can communicate with one another.

In FIG. 2, network device 200 is illustrated as including components 202-212 for simplicity and ease of understanding. In an actual implementation, network device 200 may include additional, fewer, or different components. For example, assuming that network device 200 is a virtual machine, components 202-212 may include virtual components. In another example, network device 200 may include one or more power supplies, fans, motherboards, video cards, etc. In yet another example, the components of network device 200 may be distributed over a network.

Figure 3:
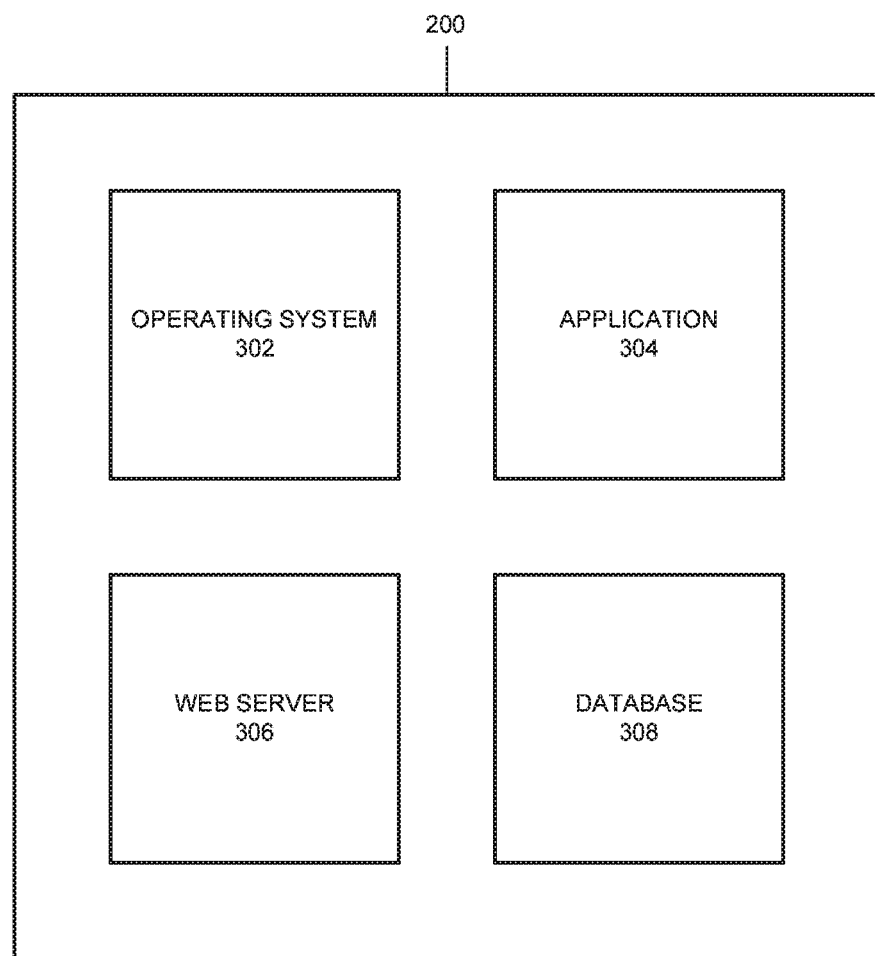
FIG. 3 is a block diagram illustrating exemplary functional components of the network devices shown in FIG. 2.

FIG. 3 is a block diagram illustrating exemplary functional components of network device 200. As shown, network device 200 may include an operating system 302, application 304, web server 306, and database 308. Depending on the implementation, network device 200 may include additional, fewer, or different components than those illustrated in FIG. 3.

Operating system 302 may manage hardware and software resources of network device 200. Operating system 302 may manage, for example, its file system, device drivers, communication resources (e.g., transmission control protocol (TCP)/IP stack), event notifications, etc.

Application 304 may include software program and/or scripts for rendering services. For example, in resource management device 104-3, application 304 may take the form of one or more programs for provisioning resources. Other examples of application 304 include a clustering program/application (e.g., an application that resides on servers of a cluster and drive the servers to behave as a cluster), a file transfer protocol (FTP) server, an email server, a telnet server, servlets, Java™ virtual machine (NM), web containers, C# programs, firewall, components to support Authorization, Authentication and Accounting (AAA), and other applications that either interact with client applications or operate in stand-alone mode. In addition, application 304 may include a specialized server program, application server, web page, etc.

Web server 306 may include a software application for exchanging web page related information with one or more browsers and/or client applications. Web server 306 may also provide support for other protocols, such as Simple Object Access Protocol (SOAP), for invoking object methods over a network. Database 308 may include records and files and may act as an information repository for network device 200. For example, in resource manager database 104-2, database 308 may store and retrieve configuration/usage data pertaining to a particular user. In another example, database 308 in job database device 104-1 may implement persistent queues for storing job descriptions. In such implementations, the queue may be robust and, therefore, recoverable upon device failure.

Figure 4:
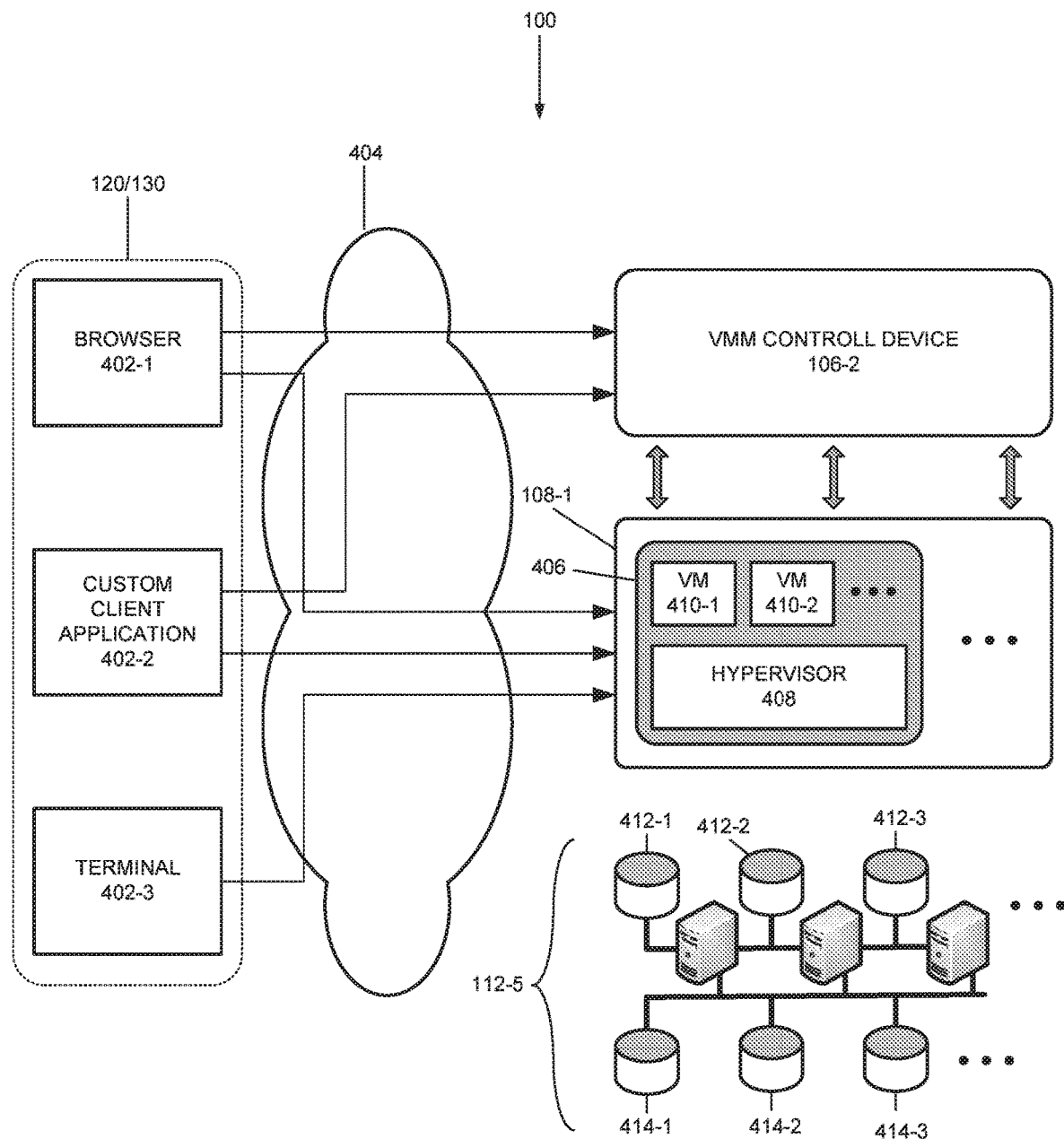
FIG. 4 illustrates interaction between a user device, VMM control device, hypervisor group, and storage device of FIG. 1 for provisioning and/or managing resources.

FIG. 4 illustrates interaction between administrator/user device 120/130, VMM control device 106-2, hypervisor group 108-1, and storage device 112-5 for provisioning and/or managing resources. The provisioning may be part of another process, for example, for provisioning a cluster of virtual servers. Network 404 may be part of network 100, and may include network or network devices, such as user portal device 102-2, resource management device 104-3, etc.

As further shown in FIG. 4, administrator/user device 120/130 may host different types of client applications, such as a browser 402-1, custom client application 402-2, and/or terminal 402-3 (e.g., xterm). Browser 402-1 may include a web browser (e.g., Internet Explorer, Firefox, Safari, etc.). Custom client application 402-2 may include a software component specifically designed for interacting with VMM control device 106-2 and/or hypervisor group 108-1. Terminal 402-3 may include a command line interface based client terminal for remotely accessing different services, such as telnet services, SFTP services, etc.

As further shown in FIG. 4, VMM control device 106-2 may interact with hypervisor group 108-1. Hypervisor group 108-1 may include a hypervisor manager (not shown) and one or more hypervisor devices 406. In hypervisor group 108-1, the hypervisor manager may administer/control hypervisor devices 406.

Each hypervisor device 406 may include a hypervisor 408 and virtual machines 410-1 and 410-2. Although FIG. 4 shows two virtual machines 410-1 and 410-2, in an actual implementation, hypervisor device 406 may include fewer or additional virtual machines that are instantiated and monitored by hypervisor 408.

For storage, each hypervisor device 408 may access logical volumes. As shown in FIG. 4, the logical volumes may be implemented via storage device 112-5. In one implementation, storage device 112-5 may include SAN disks 412-1, 412-2, 412-3, etc., and NAS devices 414-1, 414-2, 414-3, etc.

In FIG. 4, administrator/user device 120/130 may control, monitor, provision, or de-provision resources to a user via browser 402-1. Through different devices (e.g., user portal device 102-2), a user's request for a service may reach VMM control device 106-2. VMM control device 106-2 may then carry out the user's request by performing a set of functions for managing virtual machines. Other types of requests for services may reach other devices in network 102-112 in a similar manner.

Figure 5A:
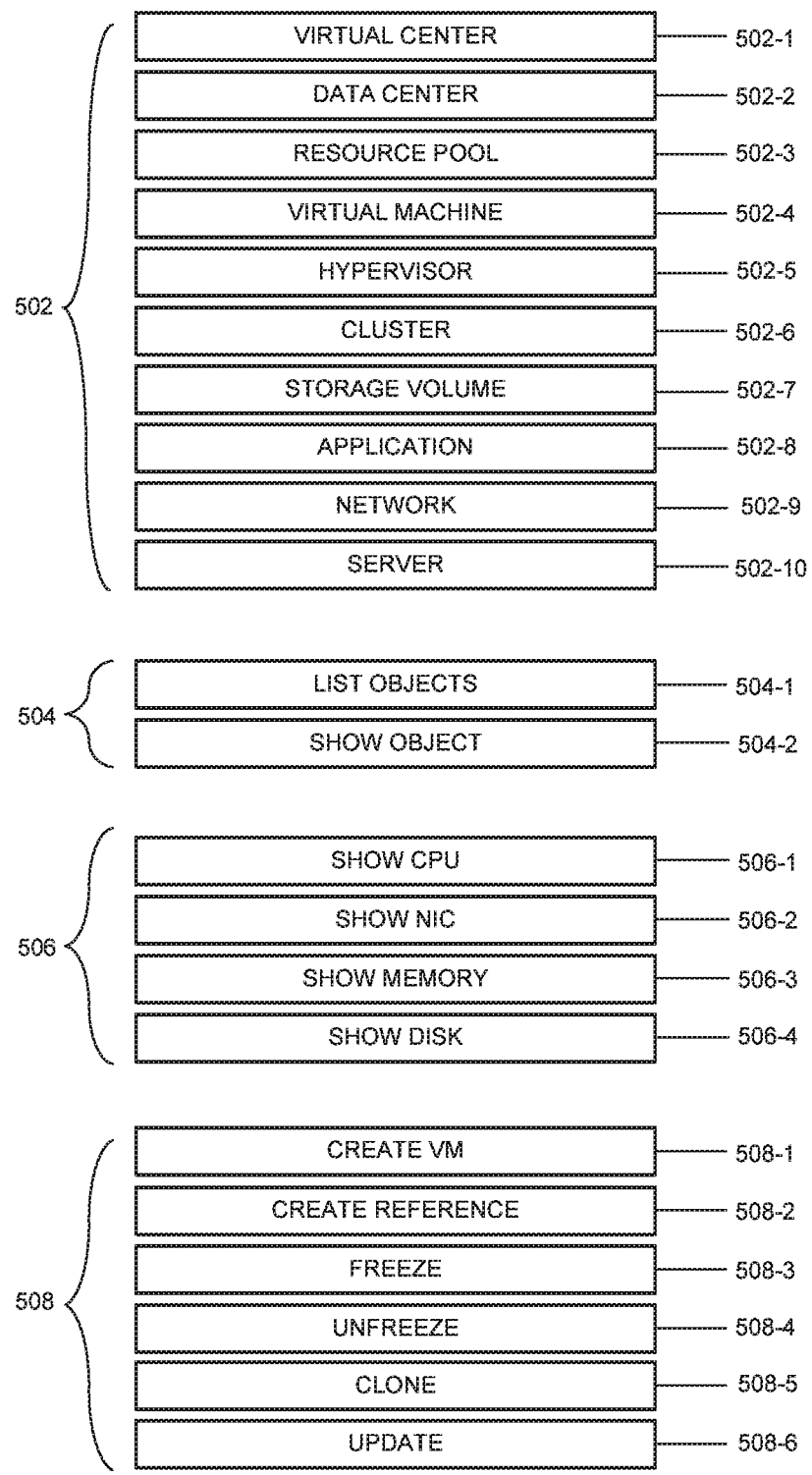
FIGS. 5A and 5B are lists of exemplary resources functions that one or more devices of FIG. 1 may support for provisioning and/or managing clusters.
Figure 5B:
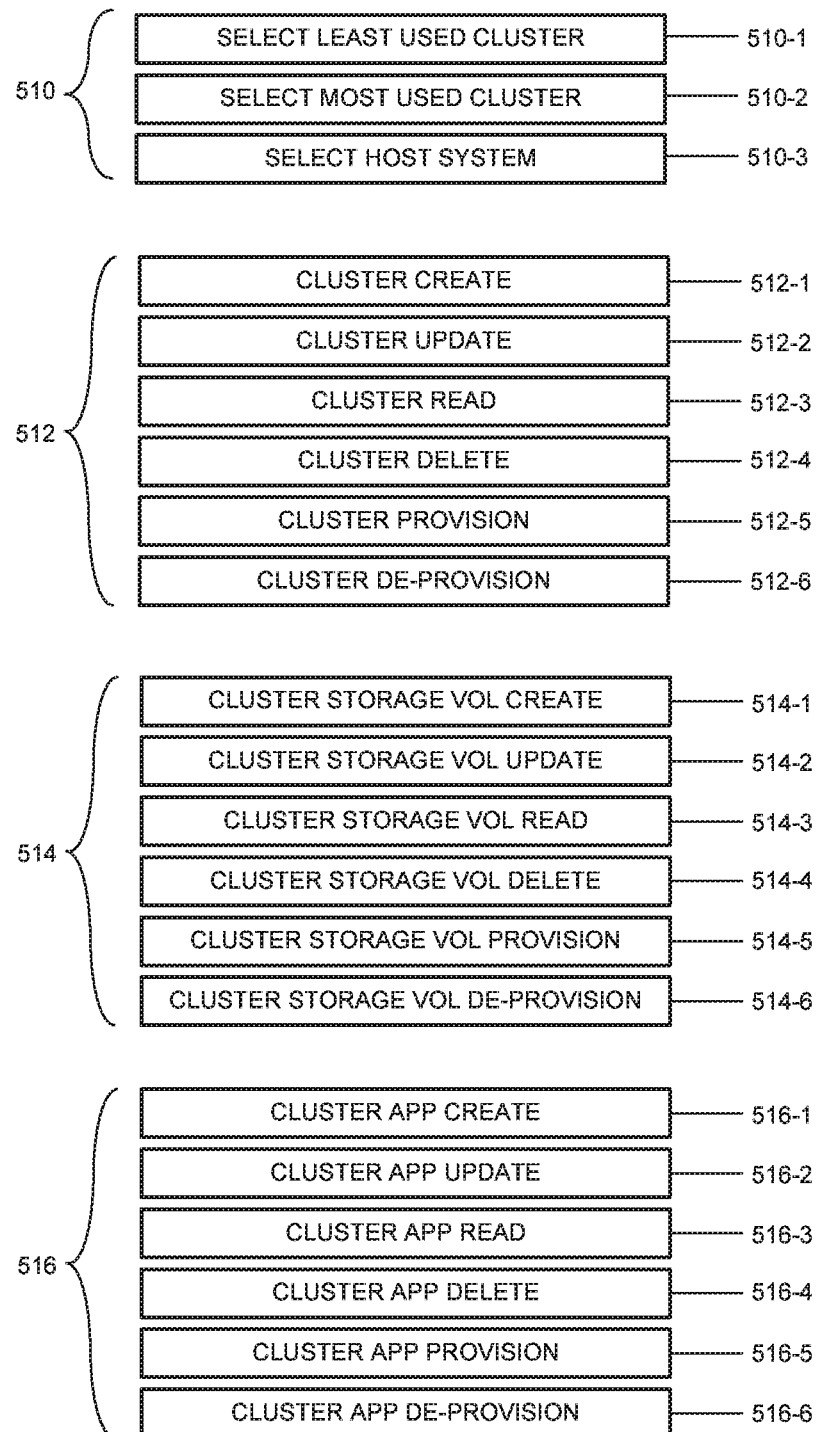

FIGS. 5A and 5B are lists of exemplary resources and functions that one or more devices in FIG. 1 may support for provisioning and/or managing clusters. The devices in networks 102-112 may invoke functions 504-1 through 516-6 on resources 502-1 through 502-10. For example, when a resource management device 104-3 receives, from user device 130, a service request to provision a virtual server, resource management device 104-3 may create a virtual machine 502-4 via VMM control device 106-2 in hypervisor group 108-1, as illustrated in FIG. 4. In another example, when user device 130 makes a service request to create a cluster based on virtual servers, resource management device 104-3 may execute function 512-1, as be described below. This may generate a job description for provisioning cluster 502-6, hand off the job description to job database device 104-1, etc.

As further shown in FIG. 5A, resources 502 may include virtual center 502-1, data center 502-2, resource pool 502-3, virtual machine 502-4, hypervisor 502-5, cluster 502-6, storage volume 502-7, application 502-8, network 502-9, and server 502-10 Virtual center 502-1 may include a collection of hypervisors 408 that are controlled or monitored by a hypervisor manager. Data center 502-2 may include a logical grouping of hypervisors. Resource pool 502-3 may include a group of hypervisor devices that aggregate CPU and/or memory capacity to be allocated to virtual machines on demand. Virtual machine 502-4 may include a software emulation of a computer system. Hypervisor 502-5 may include a program that monitors, creates, runs, removes, and/or controls a virtual machine. Cluster 502-6 may include at least one standby device and active devices. The standby device may become active when one of the active devices fail, such that the cluster may continue to operate normally (e.g., provide services to clients).

Storage volume 502-7 may include a storage unit of given size. Storage volume 502-7 may include a logical volume. Application 502-8 may include a client program, server program, script, and/or another type of executable software component. Network 502-9 may include a portion of networks 110 and 112. The portion may be provisioned to a user at user device 130. Server 502-10 may include a virtual server (e.g., a virtual machine) or a physical server.

Functions 504 may include list objects function 504-1 and show object function 504-2. List objects function may request VMM control device 106-2 to provide a list of resources 502. For example, administrator device 120 may request VMM control device 106-2 to list virtual center 502-1. When VMM control device 106-2 receives the request, VMM control device 106-2 may provide a list of names of virtual centers within network 100. Show object function 504-2 may request VMM control device 106-2 to provide details that are related to resource 502. For example, administrator device 120 may request VMM control device 106-2 to show a particular virtual center 502-1. In response to the request, VMM control device 106-2 may provide a version number of the hypervisor manager.

Show functions 506 may include show CPU 506-1, show NIC 506-2, show memory 506-3, and show disk 506-4. Show functions 506-1 through 506-4 may show a CPU usage, network usage, memory usage, and disk usage of a cluster, respectively.

Server allocation functions 508 may include create VM 508-1, create reference 508-2, freeze 508-3, unfreeze 508-4, clone 508-5, and update 508-6. Create VM 508-1 may create a new virtual machine within a data center 502-2. In requesting create VM 508-1, a device may also specify parameters for the virtual machine, such as the amount of memory for the virtual machine, number of CPUs to be used for the virtual machine, the name of the virtual machine, etc.

Create reference 508-2 may create a reference virtual server or convert a physical server into a reference physical server. As used herein, the term "reference virtual server" may refer to a virtual server prototype, which may be copied to create identically configured virtual servers, other than few configuration parameters (e.g., an IP address). As used herein, the term "reference physical server" may refer to a physical server prototype that may be used as a basis upon which other physical server devices may be identically configured, except for few configuration parameters (e.g., IP address). Freeze 508-3 may shutdown a virtual or physical server and may prepare or "prime" the virtual/physical server for duplication. Unfreeze 508-4 may resume the operation of a frozen virtual/physical server. Clone 508-5 may create a copy of a frozen, reference virtual server, or alternatively, may configure a physical server similarly as a frozen, reference physical server. Update S08-6 may update a reference virtual/physical server.

Shown in FIG. 5B, select functions 510 may identify a specific resource 502 among a group of resources 502. As shown, select functions 510 may include select least used cluster 510-1, select most used cluster 510-2, and select host system 510-3. Select least used cluster 510-1 and select most used cluster 510-2 may identify a cluster that is least used and a cluster that is most used within a portion of network 100. Select host system 510-3 may select an unused physical device in network 100 for hosting a hypervisor.

Cluster management functions 512 may include cluster create 512-1, cluster update 512-2, cluster read 512-3, cluster delete 512-4, cluster provision 512-S, and cluster de-provision 512-4. Cluster create 512-1 may create a cluster from one or more provisioned servers and storage devices (e.g., install and run clustering program/application on the provisioned servers). Cluster update 512-2 may modify an existing cluster. Cluster read 512-3 may obtain information about one or more identified clusters. Cluster delete 512-4 may delete an identified cluster. Cluster provision/de-provision 512-5 and 512-6 may provision or de-provision a cluster.

Cluster storage management functions 514 and cluster application management functions 516 may perform similar functions as cluster management functions 512, but applicable to one or more storage volumes and applications rather than to clusters.

In FIGS. 5A and 5B, resources 502-1 through 502-10 and functions 504-1 through 516-6 are illustrated for simplicity. Depending on the implementation, networks 102-112 may include and/or support additional, fewer, or different types of resources and functions. For example, other types of resources may include machine access control (MAC) addresses and IP addresses.

In tracking, managing, provisioning, and/or de-provisioning one or more resources 502 in networks 102-112, resource management device 104-3 may instantiate, use, and/or de-allocate objects that represent resources 502 and resource types. Such objects may correspond to different entries/records in databases in networks 102-112.

For example, assume that user device 130 requests a cluster. In response, resource management device 104-3 may provision a cluster, instantiate a cluster object that corresponds to the cluster in its memory 204, and create a database record for the cluster object. When user device 130 issues a service request with respect to the cluster object, resource management device 104-3 may generate a job or task with respect to the cluster in networks 102-112. Resource management device 104-3 may update the cluster object periodically, upon receiving a notification of a change to the state of the cluster in networks 102-112, and/or upon being prompted by administrator/user device 120/130.

Figure 6:
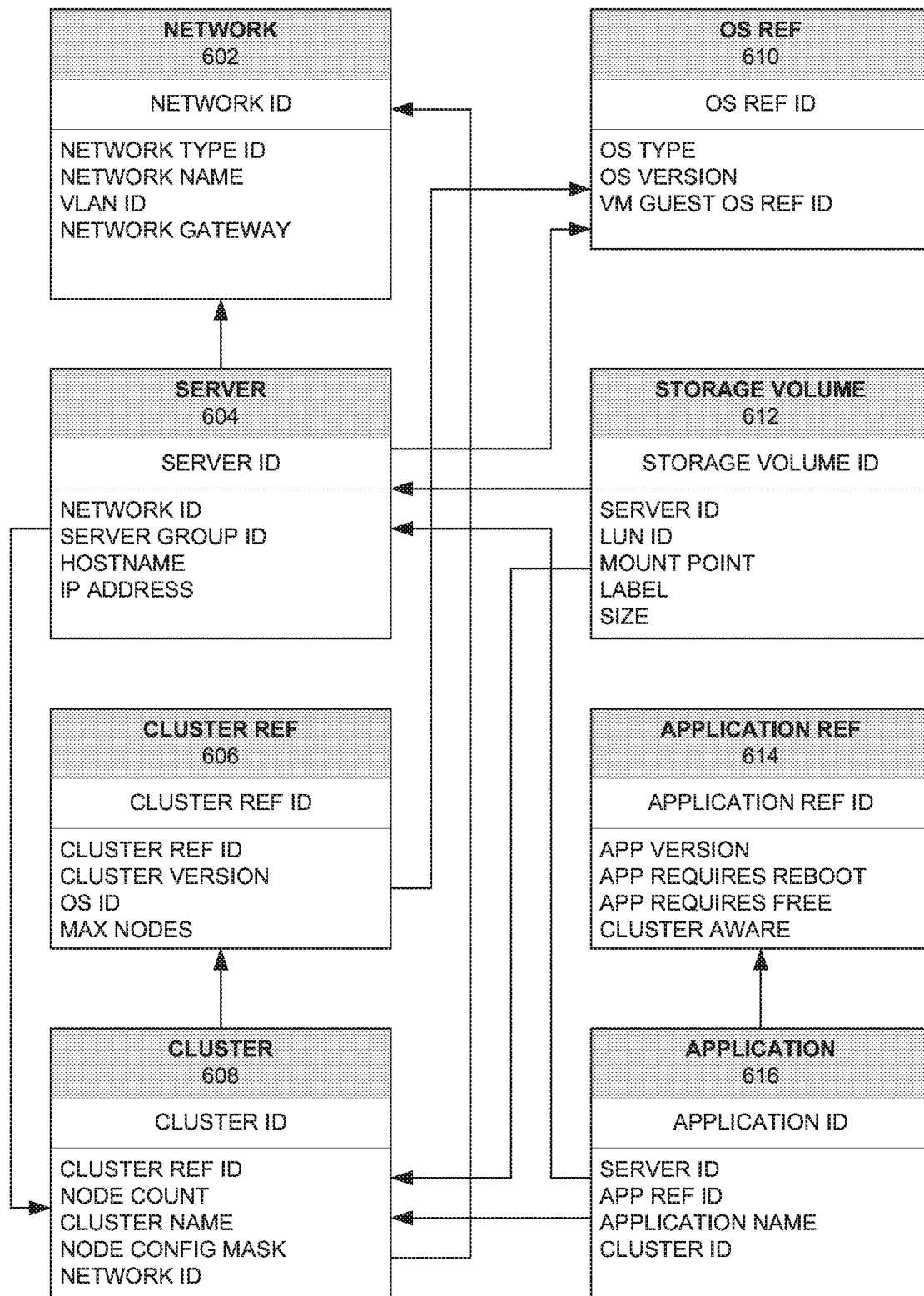
FIG. 6 is a diagram illustrating exemplary relationship between an exemplary cluster object and other exemplary objects that are managed by a resource management device of FIG. 1.

FIG. 6 is a diagram illustrating an exemplary relationship between an exemplary cluster object and other exemplary objects that are instantiated in or are managed by resource management device 104-3. As indicated above, each of objects 602-616 may correspond to an entry/record in a database in networks 102-112. As shown, objects 602-616 may include network object 602, server object 604, cluster reference object 606, cluster object 608, operating system (OS) reference object 610, storage volume object 612, application reference object 614, and application object 616.

Network object 602 may correspond to or represent a network in networks 108 and Network object 602 may include fields for holding a network ID, network type ID (e.g., demilitarized zone (DMZ), Trust, etc.), virtual LAN ID (VLAN ID), and network gateway (a device via which the network corresponding to network object 602 can be reached or accessed.

Server object 604 may correspond to or represent a virtual or physical server in networks 102-112. Server object 604 may include fields for holding a server ID, server group ID (e.g., a group of servers to which the server corresponding to server object 604 belongs), hostname (e.g., the name of the server), and IP address (e.g., an IP address assigned to the server).

Cluster reference object 606 may correspond to or represent different cluster types. Cluster reference object 606 may include fields for cluster reference ID, cluster version (e.g., the version of clustering program to be installed on nodes of the cluster), OS ID (e.g., identifier for the operating system that is installed on each of the nodes of a cluster type), and max nodes (e.g., the maximum number of nodes in the cluster type (e.g., two)).

Cluster object 608 may correspond to or represent a cluster. Cluster object 608 may include fields for a cluster ID, cluster reference ID (e.g., identifier for the type of cluster to which cluster object 608 belongs), node count (e.g., the actual number of nodes in the cluster), cluster name (e.g., the name of the cluster), node configuration mask (e.g., field indicating states (e.g., active, standby, failed, etc.) of the servers in the cluster), and cluster network ID (e.g., an identifier associated with the network in which the cluster resides).

OS reference object 610 may correspond to or represent a type of operating system. OS reference object 510 may include fields for an OS reference ID, OS type (e.g., Windows, Linux, HP-UX, OS X, etc.), OS Version, and VM Guest OS reference ID (e.g., an identifier associated with the operating system running on a virtual machine).

Storage volume object 612 may correspond to or represent a logical volume in network 108 or 112. Storage volume object 612 may include fields for a storage volume ID, server ID (e.g., identifier or the server on which the storage volume is mounted or belongs to), logical unit (LUN) ID, mount point (e.g., the name of a directory), a label (e.g., a string associated with a particular volume), and size (e.g., the size of the storage volume).

Application reference object 614 may correspond to or represent a type of application. Application reference object 614 may include fields for an application reference ID, application version (e.g., Firefox version 3.6), application-requires-reboot (e.g., a field that indicates whether an installation of the application requires a reboot of the server on which the application is installed), application requires free memory (e.g., the amount of free memory the application needs in order to be executed), and cluster name (e.g., the name of a cluster to which the application may belong).

Application object 616 may correspond to or represent an application installed on a server. Application object 616 may include fields for an application ID, server ID (e.g., the identifier of the server on which the application may be installed), application configuration ID (e.g., identifier associated with a configuration of the application), application reference ID (e.g., an ID of the application reference object that represents the type of the application corresponding to application object 616, application name, and cluster ID (e.g., the identifier of the cluster to which the application may belong).

In FIG. 6, objects 602-616 are interrelated as indicated by arrows. Each arrow indicates that a field in one object may refer to another object. For example, server object 604 refers to network object 602, and therefore includes fields for network ID. By the interrelationship illustrated in FIG. 6, resource management device 104-3 may identify, based on one object, other interrelated objects.

Although resource management device 104-3 may host other types of objects with different relationships than those illustrated in FIG. 6, they are not illustrated for simplicity. In addition, each of objects 602-616 may include additional fields. Again, these are not illustrated for simplicity. Furthermore, depending on the implementation, resource management device 104-3 (or another device) may host additional, fewer, or different types objects than those illustrated in FIG. 6.

Figure 7A:
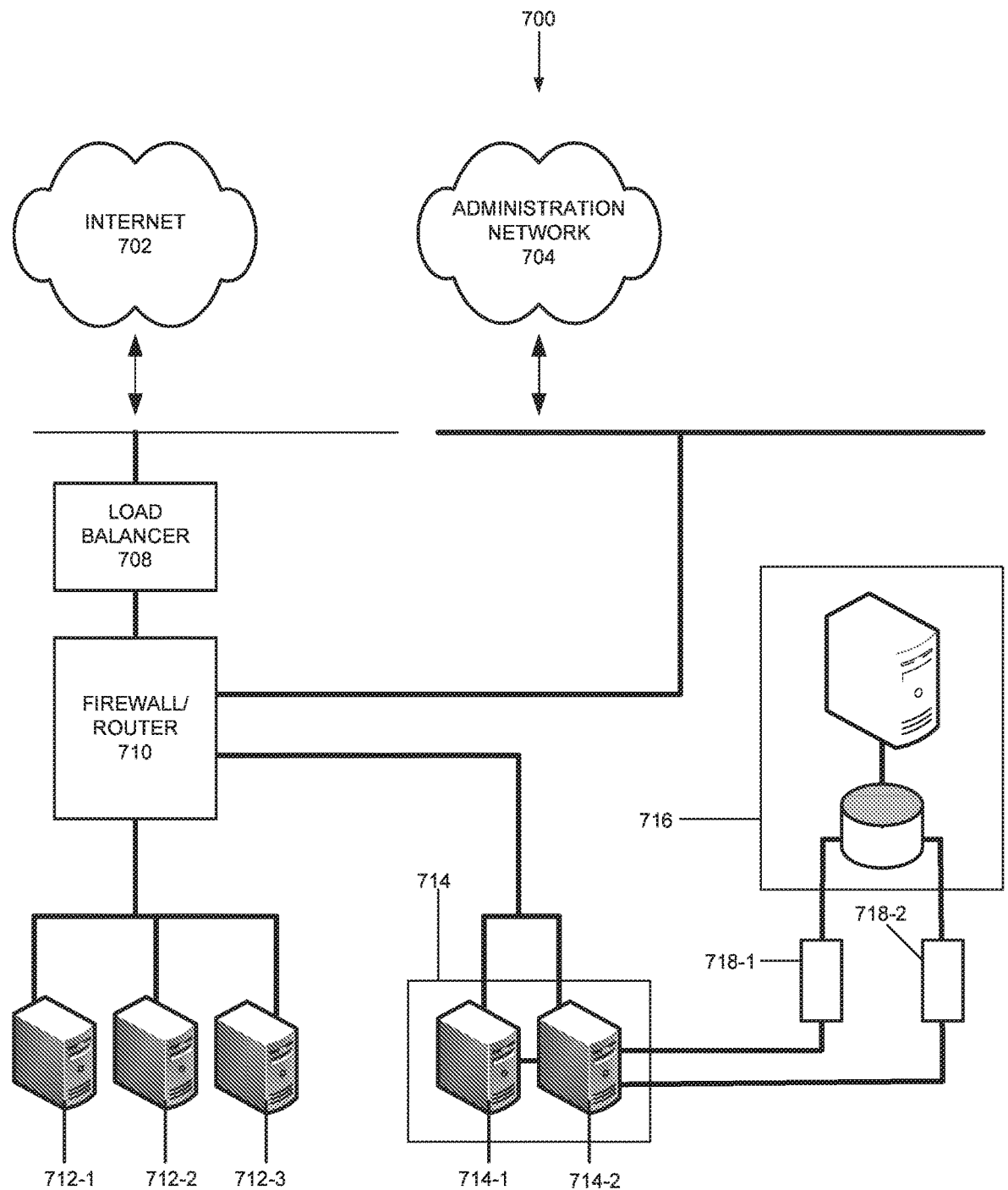
FIG. 7A is a diagram of an exemplary cluster that the system of FIG. 1 may provision.

FIG. 7A is a diagram of an exemplary cluster 714 that networks 102-112 may provision. As shown in FIG. 7A, a user may be provisioned with connectivity to the Internet 702, administration network 704, load balancer 708, firewall/router 710, virtual machines 712-1 through 712-3, cluster 714 that includes physical server devices 714-1 and 714-2, storage device 716, and fiber channels 718-1 and 718-2.

Administration network 704 may provide services such as a backup service, security service, billing, etc. Load balancer 708 may balance network traffic over different devices (e.g., load balance between virtual machines 712-1 through 712-3 and physical server devices 714-1 and 714-2). Firewall/router 710 may safeguard virtual server devices 712-1 through 712-3 and physical server devices 714-1 and 714-2 from outside networks via enforcement of firewall security rules and/or network address translation (NAT). Virtual machines 712-1 through 712-3 may host applications in virtual environments.

Cluster 714 may include physical server devices 714-1 and 714-2, each of which may host cluster program/application, operating system, application, etc. In cluster 714, one of two server devices 714-1 and 714-2 may be active, and the other server device may be on the standby mode. As two server devices 714-1 and 714-2 are in communication with one another via heartbeat signals on a heartbeat network (not shown), should one of the two devices fail, the standby device detects that the heartbeat signal from the other server device is no longer present. Consequently, the standby device becomes active, ensuring high availability of applications running on cluster 714.

In FIG. 7A, each of physical server devices 714-1 and 714-2 include a shared storage volume (e.g., a storage volume common to server devices 714-1 and 714-2) as well as non-shared volumes. The shared/non-shared storage volumes are included in storage device 716, which may be accessed by cluster 714 via one of two channels 718-1 and 718-2. Channels 718-1 and 718-2 are provided for redundancy in case of a fiber channel failure, for example.

When one of two server devices 714-1 and 714-2 fails, it is possible for the failed server device to write to the shared storage volume, which may include critical data or applications. In some implementations, networks 102-114 may provide for a mechanism to prevent the failed device from writing to the shared volume. For example, in one implementation, cluster 714 may fence the failed server by powering it down upon receipt of a signal from the currently active server.

Figure 7B:
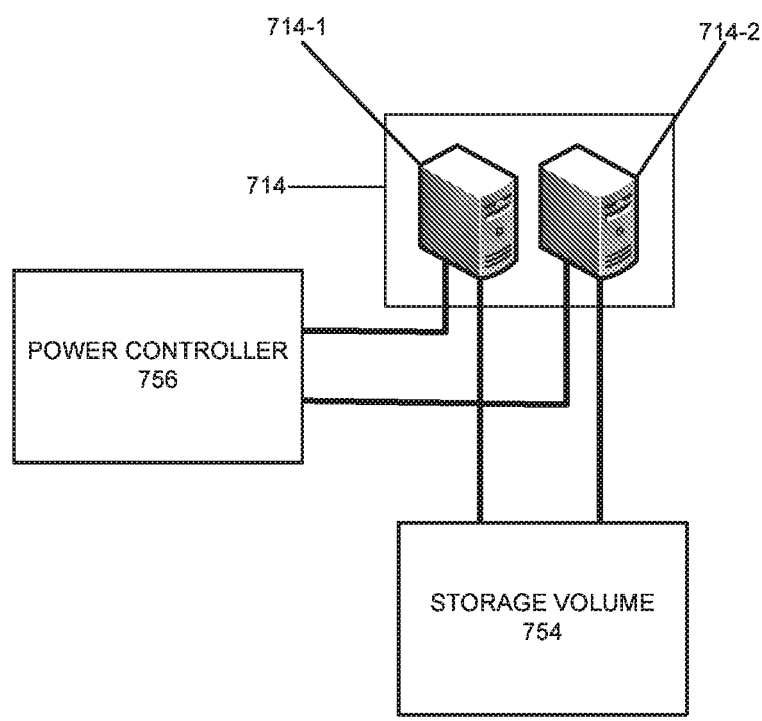
FIG. 7B illustrates fencing a server.

FIG. 7B is a diagram that illustrates fencing a server. As shown, server devices 714-1 and 714-2 of cluster 714 are attached to a shared volume 754 and a power controller 756. Power controller 756 controls whether power is delivered to each of server devices 714-1 and 714-2 in cluster 714.

When a server device in cluster 714 fails (e.g., server device 714-1), the standby server device (e.g., server device 714-2) becomes active and sends a message (e.g., a web service call via SOAP) to power controller 756. In response, power controller 756 shuts down the failed server, hence safeguarding shared volume 756 from corruption by the failed server.

Figure 8:
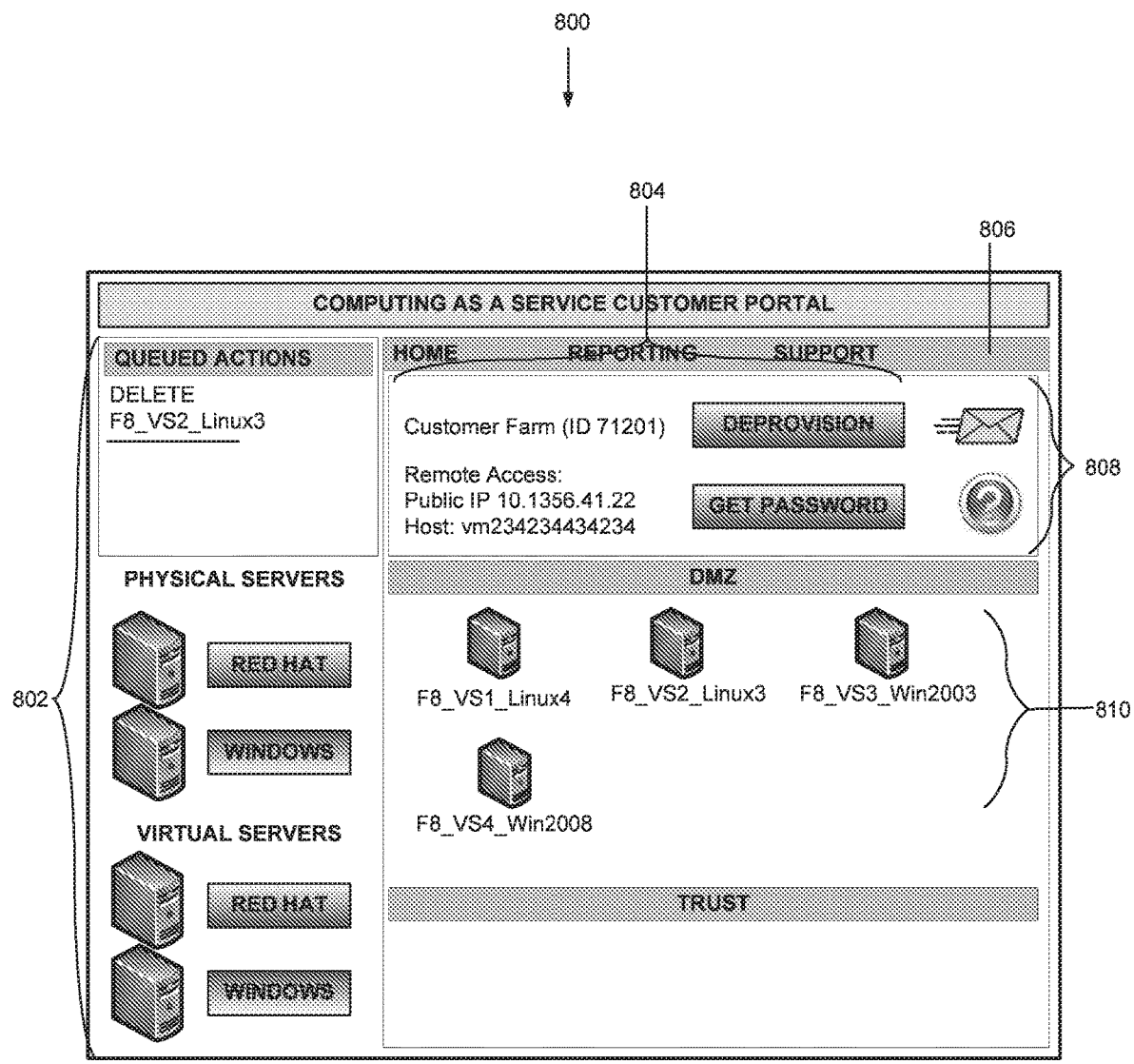
FIG. 8 illustrates an exemplary view of an exemplary web-based user interface associated with provisioning a cluster.

FIG. 8 illustrates a view 800 of an exemplary web-based user interface for provisioning a cluster. More specifically, view 800 shows a web page for provisioning servers for a cluster. Some features of a typical web browser, such as a navigation bar, etc., are not illustrated for simplicity.

As shown, the web page may include a side pane 802 and a main pane 804. Side pane 802 may include a list of servers and jobs that are pending (e.g., installing an operating system for a server being provisioned). Main pane 804 may include menu bar 806, short cut buttons 808, and server display 810. Menu bar 806 may provide links to other web pages, such as "Home," "Reporting," or "Support" page. Short cut buttons 808 include buttons for executing commands "deprovision" or "get password." Server display 810 may illustrate servers that are currently accessible or are being provisioned. Depending on the implementation, the web page may include additional, fewer, or different features than those shown in FIG. 8, such as a selection button or a menu item for requesting a cluster provisioning.

Figure 9:
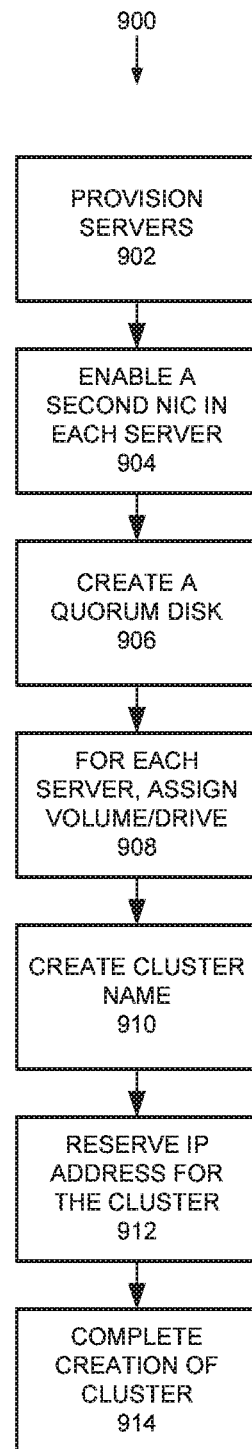
FIG. 9 is a flow diagram of an exemplary process that is associated with provisioning an exemplary cluster.

FIG. 9 is a flow diagram of an exemplary process 900 that is associated with provisioning a cluster. Assume that administrator/user device 120/130 has sent a request to resource management device 104-3 to provision a cluster. In response, resource management device 104-3 may submit jobs/tasks, to job database device 104-1, to provision the requested resource. Workflow engine device 106-1 may drive the performance of each of the submitted jobs and de-queue the performed jobs from the jobs database device 104-1.

Workflow engine device 106-1 may provision two or more servers (block 902). Depending on the user input, the servers may include a specific number of physical or virtual servers, a specific operating system, operating system configuration, a number of network interface cards, etc.

Workflow engine device 106-1 may enable a second network interface card in each of the provisioned servers (block 904). The second network interface card in each of the servers may be attached to a heartbeat network, either at block 904 or at another block (e.g., block 914).

Workflow engine device 106-1 may create a quorum disk (block 906). The quorum disk may include a storage volume that is shared by the provisioned servers. The quorum storage volume may include a data or application for a standby server in the cluster to control when one or more of the active servers of the cluster fail.

Workflow engine device 106-1 may assign, for each of the servers, a shared volume/drive corresponding to the quorum disk (block 908). This is described below in greater detail with reference to FIG. 10.

Workflow engine device 106-1 may create/generate a cluster name (block 910) and reserve an IP address for the cluster. Furthermore, workflow engine device 106-1 may enter the name and the IP address in a domain name system (DNS) server (not shown) (block 912).

Workflow engine device 106-1 may complete creating the cluster (block 914). Completing the cluster creation may include installing and/or activating clustering application/program on the servers (which may include causing the servers to send heartbeat signals to one another), configuring the cluster application/program, attaching the second NIC enabled at block 904 to a heartbeat network, etc.

Figure 10:
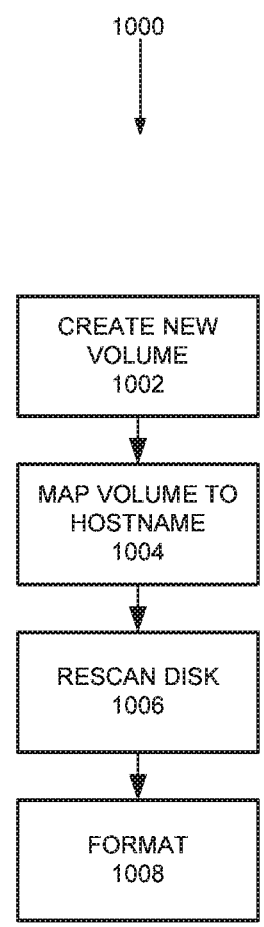
FIG. 10 is a flow diagram of an exemplary process that is associated with assigning a volume or a drive to a node in the cluster of FIG. 8

FIG. 10 is a flow diagram of an exemplary process that is associated with assigning a volume or a drive to a node in the cluster of FIG. 9. As shown, process 1000 may begin with creating a new volume from the quorum disk created at block 906 (block 1002). The volume may be logical.

Workflow engine device 104-3 may execute a script to create a logical unit (LUN) map to a server hostname (block 1004). For example, a script or program may build a LUN on the logical volume, creating a record. The LUN record may be exported or presented to the server.

Each of the server devices for the cluster may rescan its disks (block 1006). In some operating systems (e.g., Linux), rescanning the disk may include scanning fiber channel buses. After the rescan, at least one of the server devices of the cluster may format the drive (block 1008). For some operating systems, formatting the drive may include creating a disk label and partition, creating a file system on the disk, inserting the name of the file system in a configuration file (e.g., /etc/fstab file) in the server device, and mounting the file system. For other operating systems, formatting the disk may include partitioning the disk, and assigning a driver letter and label to the disk. Process 1000 may be repeated for remaining servers of the cluster, until each of the servers can access the shared drive (except the standby server).

In the foregoing description, networks 102-112 may provision both virtual resources and physical resources. When a user wishes to obtain computing resources (e.g., a network, a server, an application, a web server, a cluster, etc.), the user may connect to an integrated provisioning system via a web portal. Once connected via a web interface, the user may input parameters that describe the desired resources. Based on the parameters, the integrated resource provisioning system may provision and allocate virtual and/or physical resources with or without manual intervention from a system administrator or an operator.

In some implementations, the integrated resource provisioning system may provision and allocate clusters. Each cluster may include at least one standby device and remaining active devices that are interconnected via a heartbeat network. When one of the active devices in the cluster fails, the standby device may become active, replacing the failed device to ensure high availability of the cluster. Furthermore, to prevent the failed device from corrupting a storage device shared among the active devices, the integrated resource provisioning system fence the failed device.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

Further, while series of acts have been described with respect to FIGS. 9 and 10, the order of the acts may be varied in other implementations. Moreover, non-dependent acts may be implemented in parallel. Furthermore, in other implementations, processes 900 and 1000 may include additional, fewer, or different acts than the ones illustrated in and discussed with references to FIGS. 9 and 10.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   receiving, at a provisioning portal, a user selection of a set of resources to form a cluster in a cloud computing environment, the user selection of the set of resources including a primary virtual machine, and virtual storage, the user selection received from a web based user interface;
   provisioning the cluster in the cloud computing environment to include the primary virtual machine to execute on a first host, and a secondary virtual machine to execute on a second host separate from the first host, the second virtual machine synchronized with the primary virtual machine, the primary virtual machine and the secondary virtual machine share a heartbeat where failure of the primary virtual machine causes execution to shift to the secondary virtual machine; and
   provisioning the virtual storage as a part of the cluster in the cloud computing environment.

2. The method of claim 1, the method further comprising:
   enabling a primary virtual application in the primary virtual machine with access to the virtual storage during the provisioning of the cluster.

3. The method of claim 1, further comprising:
   provisioning the secondary virtual machine to enable the secondary virtual machine to handle failure of the primary virtual machine or the first host.

4. The method of claim 1, wherein the virtual storage can be a virtual storage area network (SAN) in the cloud computing environment.

5. The method of claim 1, further comprising:
   executing a first virtual application on the primary virtual machine and a second virtual application on the secondary virtual machine.

6. The method of claim 5, further comprising:
   copying the first virtual application to create the second virtual machine; and
   synchronizing the execution of the first virtual application and the second virtual application.

7. A computing device comprising:
   a non-transitory computer readable medium, having stored therein a provisioning portal; and
   a set of processors coupled to the non-transitory computer readable medium, to execute the provisioning portal, the provisioning portal configurable to:
      receive a user selection of a set of resources to form a cluster in a cloud computing environment, the user selection of the set of resources including a primary virtual machine, and virtual storage, the user selection received from a web based user interface,
      provision the cluster in the cloud computing environment to include the primary virtual machine to execute on a first host, and a secondary virtual machine to execute on a second host separate from the first host, the secondary virtual machine synchronized with the primary virtual machine, the primary virtual machine and the secondary virtual machine share a heartbeat where failure of the primary virtual machine causes execution to shift to the secondary virtual machine, and
      provision the virtual storage as a part of the cluster in the cloud computing environment.

8. The computing device of claim 7, wherein the provisioning portal is further to enable a primary virtual application in the primary virtual machine with access to the virtual storage during the provisioning of the cluster.

9. The computing device of claim 7, wherein the provisioning portal is further to provision to enable the secondary virtual machine to handle failure of the primary virtual machine or the first host.

10. The computing device of claim 7, wherein the virtual storage can be a virtual storage area network (SAN) in the cloud computing environment.

11. The computing device of claim 7, wherein the provisioning portal is further to execute a first virtual application on the primary virtual machine and a second virtual application on the secondary virtual machine.

12. The computing device of claim 11, wherein the provisioning portal is further to copy the first virtual application to create the second virtual machine, and synchronize the execution of the first virtual application and the second virtual application.

13. A non-transitory computer-readable medium, having stored therein a set of instructions, which when executed by a computer system cause the computer system to perform a set of operations comprising:
   receiving, at a provisioning portal, a user selection of a set of resources to form a cluster in a cloud computing environment, the user selection of the set of resources including a primary virtual machine, and virtual storage, the user selection received from a web based user interface;
   provisioning the cluster in the cloud computing environment to include the primary virtual machine to execute on a first host, and a secondary virtual machine to execute on a second host separate from the first host, the secondary virtual machine is synchronized with the primary virtual machine, the primary virtual machine and the secondary virtual machine share a heartbeat where failure of the primary virtual machine causes execution to shift to the secondary virtual machine; and provisioning the virtual storage as a part of the cluster in the cloud computing environment.

14. The non-transitory computer-readable medium of claim 13, wherein the operations further comprising:
enabling a primary virtual application in the primary virtual machine with access to the virtual storage during the provisioning of the cluster.

15. The non-transitory computer-readable medium of claim 14, wherein the operations further comprising:
provisioning the secondary virtual machine to enable the secondary virtual machine to handle failure of the primary virtual machine or the first host.

16. The non-transitory computer-readable medium of claim 15, wherein the virtual storage can be a virtual storage area network (SAN) in the cloud computing environment.

17. The non-transitory computer-readable medium of claim 13, wherein the operations are further comprising
executing a first virtual application on the primary virtual machine and a second virtual application on the secondary virtual machine.

18. The non-transitory computer-readable medium of claim 13, wherein the operations are further comprising:
copying the first virtual application to create the second virtual machine; and
synchronizing the execution of the first virtual application and the second virtual application.

* * * * *